US007346849B1

United States Patent
Mulligan et al.

(10) Patent No.: US 7,346,849 B1
(45) Date of Patent: Mar. 18, 2008

(54) EXECUTABLE CODE DERIVED FROM USER-SELECTABLE LINKS EMBEDDED WITHIN THE COMMENTS PORTION OF A PROGRAM

(75) Inventors: Thomas P. Mulligan, San Diego, CA (US); Steve H. Kolokowsky, San Diego, CA (US); Timothy J. Harvey, Temecula, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 698 days.

(21) Appl. No.: 09/826,998

(22) Filed: Apr. 3, 2001

(51) Int. Cl.
  *G06F 3/00* (2006.01)
(52) U.S. Cl. ........................ 715/763; 715/967
(58) Field of Classification Search ................ 715/764, 715/779, 781, 808, 810, 841, 843, 795, 763, 715/967; 717/106, 110, 113
  See application file for complete search history.

(56) References Cited

U.S. PATENT DOCUMENTS

| 4,541,048 | A | * | 9/1985 | Propster et al. ................ 712/32 |
| 5,485,615 | A | | 1/1996 | Wennmyr .................... 717/109 |
| 5,717,929 | A | * | 2/1998 | Furukawa et al. ........... 717/168 |
| 5,727,175 | A | * | 3/1998 | Malone et al. ............... 715/763 |
| 5,822,591 | A | | 10/1998 | Hochmuth ................... 717/148 |
| 5,923,880 | A | | 7/1999 | Rose et al. .................. 717/145 |
| 6,026,233 | A | * | 2/2000 | Shulman et al. ............. 717/113 |
| 6,078,736 | A | | 6/2000 | Guccione ..................... 716/16 |
| 6,438,746 | B1 | * | 8/2002 | Martin ........................ 717/149 |
| 6,463,578 | B1 | * | 10/2002 | Johnson ...................... 714/124 |
| 6,556,218 | B1 | * | 4/2003 | Alcorn ........................ 345/749 |
| 6,574,792 | B1 | * | 6/2003 | Easton ........................ 717/142 |
| 6,721,944 | B2 | * | 4/2004 | Chaudhry et al. .......... 717/154 |
| 6,865,713 | B1 | * | 3/2005 | Bates et al. ................. 715/512 |

OTHER PUBLICATIONS

Cypress EZ USB FX2 Tech Reference Manual, Copyright 2000, 2001 , 64 pages.

* cited by examiner

*Primary Examiner*—Kieu D. Vu
(74) *Attorney, Agent, or Firm*—Kevin L. Daffer; Daffer McDaniel, LLP

(57) ABSTRACT

An apparatus, computer program, and method are disclosed for generating computer executable code. The code is compiled from a data set, and the data set is compiled by selecting a link within a comments portion of a text editor portion of a program. The data set can then be inserted into an applications program to form the computer executable code. The comments portion involves a line of text that is preceded by a comments designator and succeeded by at least one link word that is adapted for modification by an on-screen pointer. Any changes to the link word via a graphical user interface will correspondingly change fields within a data set, which preferably is also displayed within the same window as the comments portion. The fields of bits within the data set can be used to program a hardware device or system. One example of such a device is a programmable device, or general purpose interface circuit that is juxtaposed between, for example, a computer and a peripheral device.

21 Claims, 5 Drawing Sheets

```
#define PERIPHCS 0x00AB
#define AOKAY 0x80
#define BURSTMODE 0x0000
#define TRISTATE 0xFFFF
#define EVER ;;

// prototype
void GPIFInit ( void );

// Set Address GPIFADR [8:0] to PERIPHERAL
void Peripheral_SetAddress ( WORD gaddr )
{
  if ( gaddr < 512 )
   { // drive GPIF address bus w/gaddr
     GPIFADRH = gaddr >> 8;
     GPIFADRL = ( BYTE ) gaddr; // setup GPIF address
   }
   else
   { // tri-state GPIFADR [8:0] pins
     PORTCCFG = 0x00; // [7:0] as port I/O
     OEC = 0x00; // and as inputs
     PORTECFG & = 0x7F; // [8] as port I/O
     OEC & = 0x7F; // and as input
   }
}

// read single byte from PERIPHERAL, using GPIF
void Peripheral_SingleByteRead ( BYTE xdata *gdata )
{
  static BYTE g_data = 0x00 while( ! ( GPIFTRIG & 0x80 ) ) // poll GPIFTRIG.7 Done bit
  {
      ;
  }

// using register(s) in XDATA space, dummy read
  g_data = XGPIFSGLDATLX; // to trigger GPIF single byte read transaction while( ! ( GPIFTRIG & 0x80 ) ) // poll GPIFTRIG.7 Done bit
  {
      ;
  }

// using register(s) in XDATA space, GPIF read byte from PERIPHERAL here
  *gdata = XGPIFSGLDATLNOX;
}
```

FIG. 8

EXECUTABLE CODE DERIVED FROM USER-SELECTABLE LINKS EMBEDDED WITHIN THE COMMENTS PORTION OF A PROGRAM

BACKGROUND OF THE INVENTION

1. Field of the Invention

This invention relates to the field of compilation and code generation of object code executable upon a computer. More particularly, the invention concerns compiling a data set from user-activated links within the comments portion of a program. The data set can thereafter be linked to procedure calls within an applications program to, for example, configure a logic device.

2. Description of the Related Art

There may be numerous steps involved in creating a complex computer program. A program that can execute on a computer is often referred to as the object code or execution code. Such code is specific to the computer and, more particularly, to the specific execution unit of that computer. For example, the execution code may contain instructions indigenous to the microprocessor (or execution unit) of that computer.

There are numerous types of programming languages that can be reduced to an execution code. One popular such language is the C programming language. Programs written in C can be assembled into an execution code listing specific to almost any execution unit. As such, the C programming language can support numerous types of execution units.

In order to formulate execution code, it may be necessary to compile the code from a source file. Compilers are generally unique to various types of source files. Such compilers recognize particular source files and compile those source files into an execution code listing (object code) recognizable to the execution unit.

Compiling the source code into execution code can occur in various ways. For example, the user can write code in a text editor. Once the user is satisfied with the written code, he/she can then save the code to a file and perform syntax checks by parsing the code using a compiler. A utility program can then be used to assemble or generate the execution code, which can thereafter be stored as an output file. In the above methodology, the user writes and edits code in a text editor format and, when satisfied with what has been written, assembles the code in the final, execution code format.

A more sophisticated code generation technique may be used, however. For example, the user may respond to a series of questions. Based on the user's response, a program file can be produced. The program file is a rudimentary form of the text editor file that can thereafter be modified by the user before running the assembler utility. By answering a sequence of questions, the user will invoke an application builder tool.

Whether code is compiled manually or through a series of questions, the conventional methodology for code generation is through use of a text editor and, after text has been edited, assembling that code into an object or execution file for use by the execution unit. While text is easily understood by the human editor and thus files in text format are beneficial, generating code from a text editor is sometimes cumbersome and time consuming. Also, it is not always easy for a user to determine the relationship between his/her edits made to the text editor and the resulting, compiled code. Therefore, it would be desirable to derive a less cumbersome and less time-consumptive process of generating execution code. A desired process would be one which allows the user to easily and quickly edit text using a more recognized Graphical User Interface ("GUI"), and to visually track the changes made using the GUI to resultant changes in a source file. These benefits are currently lacking in conventional code generation techniques employing text editors.

SUMMARY OF THE INVENTION

The problems outlined above are in large part solved by a code generation technique using links placed within corresponding lines of text designated as comments of a program. Specifically, a program can be displayed on a display device in, for example, a windows-based format. Given that windows-based programs are graphic intensive, the links can be accessed by a pointer device connected to a computer which executes the windows-based program. By directing the pointer device to the link contained in the same line as a comments designator of the program, the link can be activated by clicking the pointer device, or otherwise actuating the pointer device. Once activated, the link may have associated pull-down menus for changing the link in accordance with a selection made by the pointer device. Whenever the value shown by the link is changed or modified, a corresponding field within a source data set is also changed.

Advantageously, the comments portion of a program containing lines of text preceded by the comments descriptor (e.g., "//") can be displayed on the same screen, and possibly within the same window with the source or data file. Thus, any changes made to the link designator will appear in the comments portion, and the resulting changes will appear in the data set. In this manner, the user will be instantly apprised of the effect on the source or data file whenever he/she makes changes to a link designator. By placing the link as text within the same line as a program comment, the program comment can be written in text to represent anything whatsoever about the corresponding link. Changes to the comment text will have no effect whatsoever on the program, but will be highly descriptive of the link. By placing the link in the comments section of a program, the link is documented by the user with whatever words are most descriptive about the link. Additionally, the program is compiled after the comments are generated. In other words, the links can be built around the comments. Once the comments are written, links are added succeeding corresponding lines of textual comments. This is a reverse of normal program generation, where executable code is generated first, and then comments are added for documentation purposes only.

According to one exemplary use, the links can be accessed through a GUI for programming an interface between two sub-systems. There are numerous types of programmable interfaces or "programmable devices." Generally speaking, a programmable device is any device that can be configured to achieve a specific logic function dependent on a software program. In other words, the logic device can be designed generically, and thereafter reconfigured through software to achieve a specific interface function. A popular programmable device can include gate arrays, logic arrays, and interface devices, each of which may be reconfigured in the field. The interface device can originally be designed as a general purpose interface device, which can later be reconfigured to achieve a specific purpose based on how that interface device is programmed. A General Purpose Interface Device ("GPIF") can be programmed from the source or data set derived from alterations made to the present links. By changing the links within the comments portion of a program, a user can modify the data set (alternatively known as waveform descriptors in GPIF language) and then apply that data set to the execution unit of the GPIF. Thus, the data sets can be used by any execution unit, or by a particular execution unit applicable to a GPIF. Regardless of its application, the data sets can be easily modified and visually monitored within the same display window as the modifiable links.

According to one embodiment, a method is provided for generating computer executable code. The method includes compiling a data set by selecting a link within a comments portion of a program. The compiled data set can then be inserted into an applications program to form the computer executable code. The comments portion includes lines of text, each line preceding the text by a comments designator. One form of comments designator recognizable to a C programming platform is the "//" designator. The link can be selected by dragging an on-screen pointer to the link. When the pointer passes over the link, the link might change colors or otherwise become highlighted to note that the link is a "hot" link. A hot link is one that can be modified by clicking on the link to activate a pull-down menu. The pull-down menu might have different selections which can be chosen by the on-screen pointer.

According to another embodiment, a computer program is provided. The computer program may include a first line of text preceded by a comments designator and succeeded by at least one link word. The link word is alterable by selecting the link and the associated item within the pull-down menu, all of which is undertaken by the link word being displayed on a windows-based screen format and a graphical user interface. A second line of text can also be displayed within the window that accommodates the first line of text. The second line of text represents a data set that can change dependent on modifications to the link word by the on-screen pointer. As such, any modification to the link word will cause the data set to change. By viewing the window, a user can note in real-time any changes to the data set which result from changes to the link word, or vice-versa. This allows the user to view the effect of a link word modification. When the program is reloaded, the user can also note the effect on a link word by any preceding modification to one or more fields within the data set.

According to yet another embodiment, an apparatus is provided. The apparatus may be used for generating programmable signals output from hardware. The hardware can include any device which can be alterable by a data set. The apparatus, therefore, includes a compiler for generating a data set containing at least one field of bits. The data set will change in response to changes of the link.

BRIEF DESCRIPTION OF THE DRAWINGS

Other objects and advantages of the invention will become apparent upon reading the following detailed description and upon reference to the accompanying drawings in which:

FIGS. 4-8 illustrate one example of which links within a comments portion of a program are used to compile a data set, wherein FIG. 4 illustrates a compiled data set (stored as waveform descriptions) being used to program a logic device coupled between a peripheral device and an execution unit;

FIG. 5 is a state diagram of various operational states of the logic device, and the transitions that occur between states according to behavior, output, input and timing instructions contained within the data set;

FIG. 6 is a window of a program containing a comments portion with certain links within the comments portion being user alterable such that changes to the user-alterable links will cause a corresponding change in a data field also displayed in the window;

FIG. 7 is a timing diagram of a waveform configured from the data set (i.e., waveform descriptors) of FIG. 6, where such waveform is stored in memory and is thereafter useable by the logic device; and FIG. 8 is a compiled code fragment of executable code derived from a single read (or write) operation at interval 1 of FIGS. 6 and 7.

Figure 1:
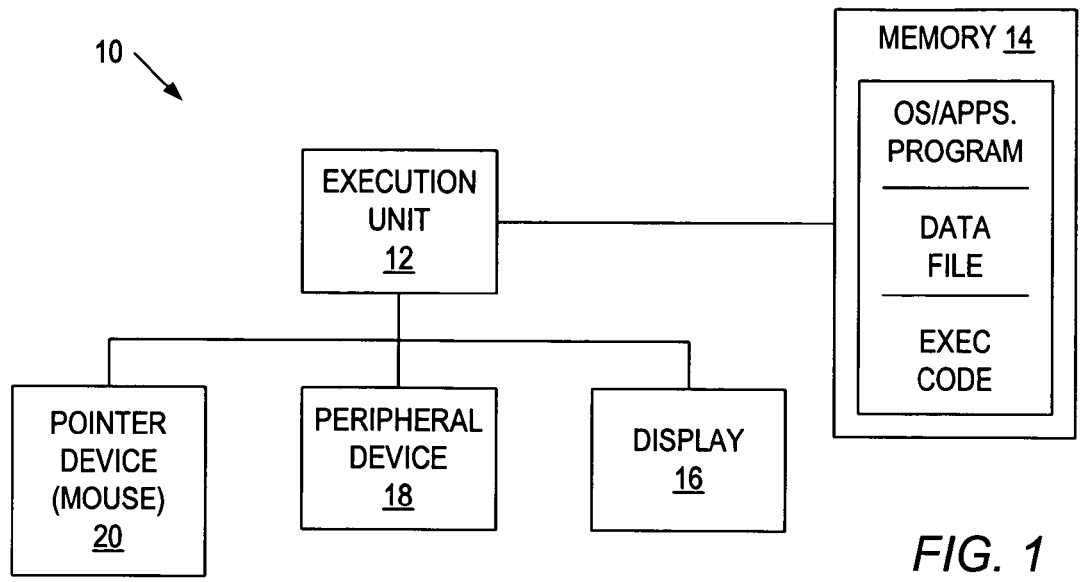
FIG. 1 is a partial block diagram of a computer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a computer 10. As with all computers, computer 10 includes an execution unit 12, and memory 14 linked to execution unit 12 by, for example, a memory controller. Memory 14 may be system memory, or semiconductor memory, or a combination of semiconductor memory and secondary memory, such as electromechanical or optical memory (i.e., disk drives, CDROMs, etc.). Within memory 14 are executable programs and files. For example, the memory may contain operating system programs and application programs. The operating system is used to initiate computer 10, while the application program can be used to run various application-specific routines. As will be noted further below, memory 14 can also include a data set and execution code. Both the data set and execution code are assembled and/or compiled using various utility software programs, well-known to the skilled artisan.

In addition to memory 14, various other devices can be linked to execution unit 12. For example, a display 16 can be linked to execution unit 12 either on the local bus of the execution unit, a mezzanine bus, or peripheral bus. Display 16 includes any electronic display upon which an image or text can be presented. A suitable display includes a cathode ray tube, a liquid crystal display, etc. A peripheral device 18 can be linked directly to the local bus of execution unit 12 or, preferably, through a bus interface unit to execution unit 12. Peripheral device 18 can, for example, be linked to a PCI bus, SCSI bus, or any other well-known mezzanine or peripheral bus. Preferably, execution unit 12 is any device which can execute instructions. Popular such units include a processor or central processing unit ("CPU"). The processor can operate from an x86 instruction set or a reduced instruction set ("RISC"). Peripheral device 18 includes any device that is located peripheral to execution unit 12 and includes a network interface card, video accelerator, audio card, hard or floppy disk drive, SCSI adapters, and/or telephony cards (modem), etc.

Depending on whether the operating system program within memory 14 contains GUI programs, a pointer device 20 may be present. Pointer device 20 is any device which can move an on-screen pointer that appears on a window or screen-shot of display 16. The pointer device should also be capable of receiving user-actuation which translates to actuation of the on-screen pointer. A conventional pointer device 20 includes a mouse, light-pin, or any other device which can move the on-screen pointer a distance corresponding to movement of the pointer device across a surface.

Figure 2:
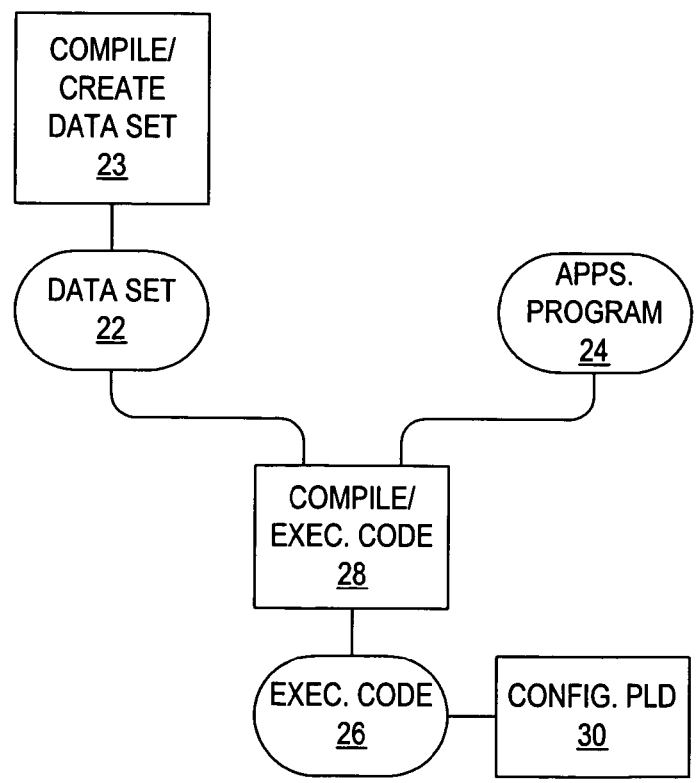
FIG. 2 is a flow diagram of several steps used in compiling a data set and linking the data set to an applications program to form code that can execute upon an execution unit, such as that shown in FIG. 1.

FIG. 2 is a flow diagram of steps used to compile a data set and, from that data set, additional steps used to compile execution code. According to one example, the execution code may be used to configure output from a programmable device. Forming a data set 22 begins by compiling the data set 23. Once compiled, the data set can be linked, merged, or otherwise assembled within an applications program 24. The assembled applications program represents compiled executable code 26 resulting from the compiling or assembly step 28. In many C programming environments, a system utility is invoked to generate compiled code for application programs. Compiler products can be obtained from various well-known vendors.

Data set 22 may include accessors for accessing object instances within an application program. It may be possible to generate updated executable code by merely redefining the data set 22 and re-linking the resulting object code, without necessarily recompiling the application program code.

In accordance with one aspect, system software is augmented by enhanced code generation software for instructing the execution unit to carry out code generation and related operations. Such operations can include the configuration of the programmable device 30 is described herein below. Application program 24 and the compiled execution code 26 contain instructions describing the user interface and the configuration process, and can also include a high-level description of the desired programmable device circuit. The execution code, according to one embodiment, can comprise calls to library elements (function calls) to libraries of software constructs of the hardware representation.

Figure 3:
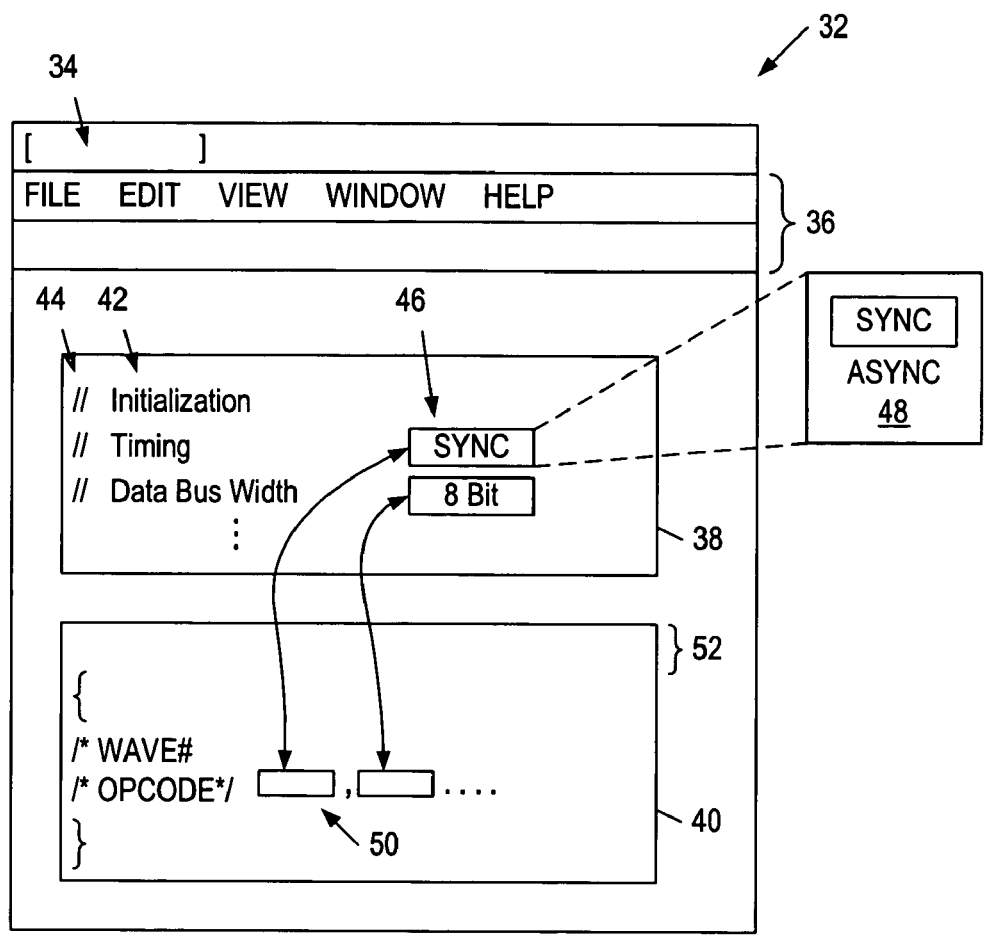
FIG. 3 is a plan diagram of a window presented upon the display of FIG. 1 containing links within a comments portion of a program, said links when activated by a user are selectable to generate, modify, alter, or otherwise compile byte fields within a data set also displayed upon the window.

FIG. 3 is a plan diagram, representing at least a portion of a screen-shot 32. Screen-shot 32 can be presented in windows-based format upon the display 16 of FIG. 1. The plan drawing 32 represents a window having a filename 34 and a toolbar 36. The filename and toolbar format is similar to that of any windows-based program, where differing files can be opened, closed, and edited. Contained within the working area of the window are two portions 38 and 40. Portion 38 includes lines of text 42 preceded by a text descriptor 44. One or more lines of text comments may include one or more words, hereinafter referred to as links. The comments section of the program code is, therefore, said to have active links (similar to internet URLs) that are used to select different configuration options and also to select behavior, timing and output of generated program code (execution code). The links represent a given area to which the on-screen pointer can be directed. When the on-screen pointer passes over the area associated with a link, the link will change colors or become highlighted to note the link is "hot." A hot link will present a pull-down menu. In the example shown, the hot link SYNC, noted as reference numeral 46, has an associated pull-down menu 48. The pull-down menu will be displayed on the working area of the window, where the on-screen pointer can then point to ASYNC if a change is desired to link 46. Importantly, the change will occur in the comments line that describes the significance of its associated link. In the example shown, comments line noted as "Timing" suggests that the timing can be either synchronized or asynchronized. Moreover, the comments line noted as "Data Bus Width" can depict the width of the data bus, where selection of the corresponding link allows the user to change between, for example, an 8-bit data bus width and a 16-bit data bus width.

Any change to links within comments portion 38 will have a corresponding effect on the data set within portion 40. For example, if the SYNC link is changed to ASYNC, then a change is made to the corresponding field 50 within, for example, an OPCODE instruction. Accordingly, each link corresponds to a particular field within the data set. For example, SYNC link may note a hex008a data field, while ASYNC link may note a different hex value within the same field of the data set corresponding to SYNC. A user will be able to note the correspondence between a link and its corresponding data set field. Any user-altered link will change the bit value within a corresponding field of the data set.

The data set 40 can be displayed on the same window as the comments portion 38 or, alternatively, comments portion 38 can be found on one window and data set 40 on another, with an appropriate toolbar and filename header 52 being associated with each window. Regardless of whether portions 38 and 40 are displayed within the same window or in different windows, any changes to a link will appear in the corresponding field of the data set. Conversely, any changes to a field of the data set will appear as changes to the corresponding link. Accordingly, if the value within field 50 is changed, link 46 will illustrate possibly ASYNC instead of SYNC. Reloading the program will effectuate a new textual reference within the area of the corresponding link.

The data set is, therefore, deemed one that is compiled from a graphical user interface as links displayed in a text editor, along with support code to complete the working program. A user can evaluate the resulting code or data set 40 while always viewing the link 46 and the associated comments within portion 38. There is no context switch necessary for the user since the user is always looking at the changing code itself. The completed program is, therefore, self-documented. The user will not need to use an applications builder tool. Moreover, the code or data set is generated at the beginning of the process, rather than at the end of the process. The user is working real-time in the execution code domain by taking links within the comments field and turning those links into program code automatically. The hotspots and associated links serve as a general GUI for the documentation and configuration of executable code, and serves as a general GUI for the configuration of any embedded environment. The user that is always looking at a complete program file (or data file), and the program file may be updated by selecting options at any time. Even after quitting and restarting, the user is always working in the program code domain, and the documentation is automatically updated.

EXAMPLE

Figure 4:
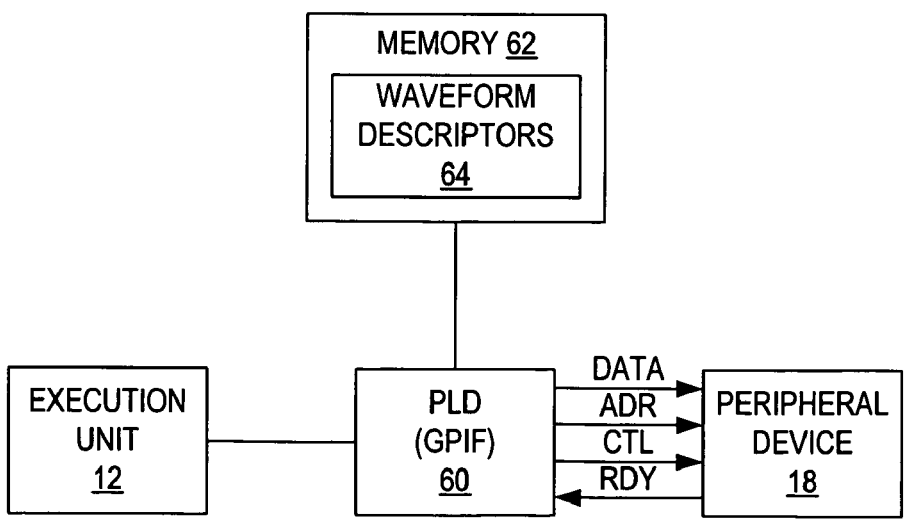

FIG. 4 illustrates the programming of a programmable device or GPIF 60. Device 60 is any device which can be programmed by software from a generic hardware configuration. Device 60 contains combinatorial and sequential logic, which may be configured in an array. Device 60, when used as an interface, is coupled between the execution unit 12 and the peripheral device 18. Device 60, when operating as an interface, is a hardware device that provides seamless interface between peripheral device 18 and execution unit 12. According to one example, the device operating as a GPIF can be configured to operate as an interface between a Universal Serial Bus ("USB") and the conventional parallel architecture of an execution unit. In this fashion, GPIF 60 allows a peripheral device to be one that can plug into a USB in seamless fashion. The USB can be configured on the external chassis, as a USB port of the computer. Output from GPIF 60 includes data address and control signals sent serially to the peripheral device over a USB, where and GPIF 60 can receive an input signal such as a ready (RDY) signal. Coupled to GPIF 60 is a memory element 62. Stored within memory element 62 is a data set that, according to the present example, can include waveform descriptors 64. Waveform descriptors are defined by the fields within a data set to control the GPIF output, and essentially tailor the data address and control outputs from device 60. Memory 62 can be a part of device 60 or separate from device 60. According to one example, memory 62 can be the same as memory 14, or can be within execution unit 12 (shown in FIG. 1). Regardless of the location of memory 62, a data set can be stored within memory 62, and that data set can, therefore, represent a waveform output from the GPIF. The waveform is preferably compatible with the USB. In this manner, the GPIF can be an ASIC device to allow specific configuration of protocol within, e.g., a USB peripheral device and any execution unit.

Figure 5:
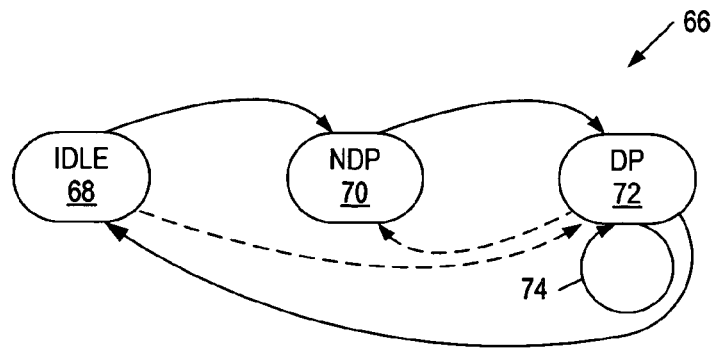

FIG. 5 illustrates a state diagram of operational states within device 60 of FIG. 4. State diagram 66 illustrates three states in which the sequential machine within the device can reside. According to one example, the device can take on up to seven intervals, with the seventh interval being an idle state 68. Subsequent to the seventh interval, a first interval will occur. That interval can represent a non-decision point (NDP) interval or state 70. Alternatively, the first interval can be designated as a decision point (DP) interval 72. Any given NDP interval can delay a GPIF cycle using one or more wait states. That is, the output to the peripheral can be maintained for N rising edges of the interface clock. For any given DP interval, the GPIF cycle can branch to another interval depending on the logic state of two signals. The DP interval can also re-execute the same interval by incrementing the data output and address output by one value for each re-executed loop, shown as item 74. After the sixth interval, the state machine reverts back to the idle state 68. By designating up to seven intervals, a waveform can be depicted having seven intervals stored within the waveform descriptor. There may be multiple seven-interval descriptor tables, if necessary, to depict an entire output of the GPIF. The number of intervals is determined from the depth of the FIFO buffers which, in this example, stores up to seven intervals before an overflow condition occurs. The FIFO buffers are periodically reloaded with new waveform descriptors representative of each of the seven intervals. By periodically reloading the FIFO buffers and flushing the executed intervals, any waveform output from the GPIF can be programmed using the data set or waveform descriptors stored within the memory.

Figure 6:
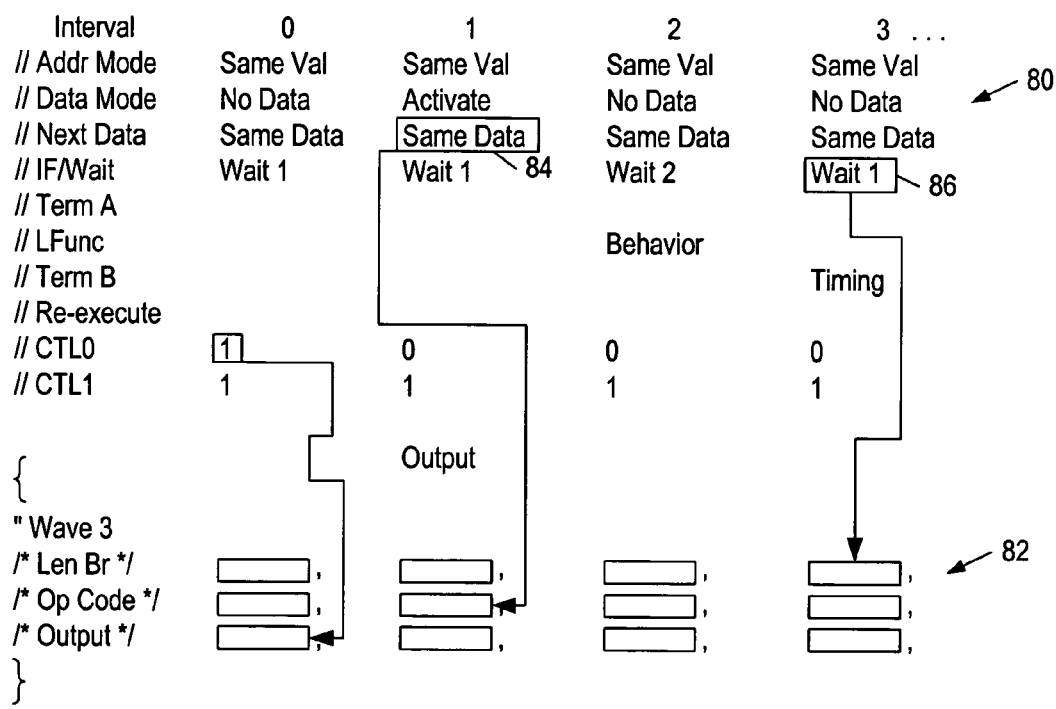

FIG. 6 illustrates the relationship between a comments portion of a program and the corresponding data set fields which, in this example, are known as waveform descriptors. The comments portion 80, and waveform descriptors 82 are similar to the comments portion 38 and data set portion 40 of FIG. 3. However, the primary difference is that the embodiment shown in FIG. 6 is applicable to a GPIF compiled instructional code, and the data set of FIG. 3 is generic to any application.

Contained within the comments portion 80 are links which can be user-selected or modified. For sake of brevity, only two links 84 and 86 are shown being modified. Link 84 will note that for the first interval (interval 1) the next data will not change, and will remain as the previous data or "Same Data." If the data output at interval 1 is to change to, for example, "Next Data," a user will actuate link 84 and make the appropriate change in the pull-down menu from "Same Data" to "Next Data." Any change to link 84 will appear in the second field of the "Op Code" command line of data set 82. Likewise, any change to the interface/wait line of interval 3 by changing the link 86 will cause a corresponding change in the fourth field of the length/branch ("Len Br") data set.

The layout of the comments portion 80 and the waveform descriptors 82 can apply to any structure desired, and the example provided is only one of various ways in which to note behavior, timing, and output descriptions of a waveform. Thus, waveform 3 ("Wave 3") can be described in numerous ways, with the example of FIG. 6 indicating three different characteristics placed in three different description subcategories noted as length/branch ("Len Br"), "Op Code," and "Output." Each interval can have different selectable links and corresponding comments. In the example shown, the comments note a particular address and data mode as either the same value or next value address or the data mode being no data or activated data. Next data and interface/wait comments will note whether the next data will be updated or whether the data will be the same as the previous data and whether the GPIF will be stalled (i.e., waited one, two, three, or more interface clock cycles), or if an interface will occur. Depending on whether the interval is in an DP state, various terms, such as Term A and Term B, can be combined according to a function (and/or/XOR) known as "LFunc." A DP interval can be repeated or re-executed if the re-execute comment contains a link in that interval to activate the re-execute mode. Control outputs can also be modified to either 1 or 0 states, as shown. The control outputs are needed to control the data and address signals forwarded from the GPIF to the peripheral device. If, in an DP interval, the LFunc is an "AND," and Terms A and B are at a logic high state, then the DP interval will transition to the next interval only when the ANDed terms are met. Accordingly, if the ready input (RDY) is ANDed with another ready input (RDY), then DP will transition to the next interval only when the ready input (RDY) becomes active. Otherwise, DP may continue in, for example, its reexecute state if re-execute is toggled on through a link in the comments portion 80. For sake of brevity, Term A, Term B, LFune, and Re-execute links are not shown since the setup of FIG. 6 is indicative of a NDP interval, whereby data is read by the GPIF or written from the GPIF in interval 1 due to the data mode being activated. The details of the various text links and corresponding comments, and the data set of corresponding fields is not applicable to the overall concept of simply having links which can be activated and modified by a on-screen pointer, and corresponding fields within certain command lines of a data set which are modified accordingly.

Using the example of FIG. 6, a waveform can be generated from the GPIF. The waveform will present an address and data within the first interval "i1." The address and data values are present in the first interval due to the data mode being activated, as shown in FIG. 6, in interval 1. Thereafter, data mode is no longer activated and neither an address nor data value is output from the GPIF. Note that during interval 2, a "Wait 2" link is asserted causing two cycles of the interface clock (IF CLK) to occur between interval 1 and interval 3. The control output transitions to an active low value at interval 1, and remains in that low value until changed by the user. Although it is understood that seven intervals are present, only four intervals are shown for brevity.

Figure 7:
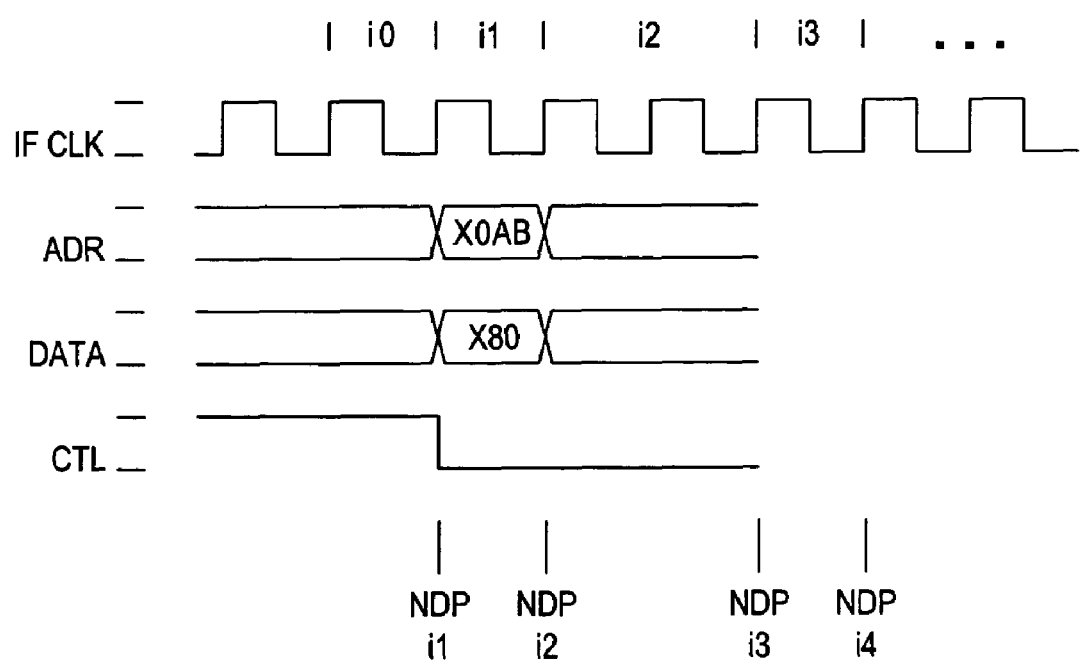

FIG. 8 illustrates compiled execution code in C language platform for a single read operation. Single read can correspond to the single read which occurs during the first interval, i1, shown in FIG. 7. FIG. 8, therefore, indicates the mechanism by which the data set, or waveform descriptor 82 shown in FIG. 6 can be compiled or assembled into object code recognizable to the GPIF. The GPIF will perform a single read as instructed by the user's input to comments portion 80 and the resulting data set instructions in portion 82, whereby portion 82 is reduced to executable code shown in FIG. 8.

It will be appreciated to those skilled in the art having the benefit of this disclosure that the embodiments described are believed applicable to the programming of any system which can execute from object code. The object code is assembled from source code and an application program derived from a data set. The data set is any file or data set in memory containing data that is derived from user-activated links within a comments portion of a program. One example of a system that can execute from object code is a GPIF. It is noted, however, that the overall concept of using links and presenting those links in a comments portion of the program are not limited to a GPIF embodiment. Accordingly, the specification and drawings are to be regarded in an illustrative, rather than a restrictive sense as to possibly numerous types of programmable hardware devices, architecture, circuitry, and methodologies which fall within the spirit and scope of the present invention.

What is claimed is:

1. A method for generating computer executable code, comprising:
   creating a data set by modifying a comments portion of a program, wherein said modifying comprises activating a user-selectable link embedded within the comments portion; and
   inserting the data set into an applications program to form the computer executable code.

2. The method as recited in claim 1, wherein said creating comprises displaying the link within a line of text preceded by a comments designator.

3. The method as recited in claim 1, wherein said creating comprises displaying a window containing the comments portion and the data set.

4. The method as recited in claim 1, wherein said modifying comprises directing an on-screen pointer to the link and actuating a pointer device that is communicable with the on-screen pointer.

5. The method as recited in claim 1, wherein said modifying comprises:
   initiating a pull-down menu;
   directing an on-screen pointer to items shown on the pull-down menu; and
   actuating a pointer device electrically coupled to the on-screen pointer.

6. The method as recited in claim 1, wherein said creating comprises setting byte fields within the data set for defining an electrical waveform.

7. The method as recited in claim 1, wherein said creating comprises setting waveform descriptor commands of a programmable interface circuit.

8. A computer-usable carrier medium comprising a computer program, wherein the computer program comprises:
   a first text preceded by a comments designator and succeeded by at least one link word that is adapted for modification by an on-screen pointer; and
   a second text displayed on a display device along with the first text for presenting a data set that changes dependent on modification to the link word by the on-screen pointer or by modification of the data set.

9. The computer-usable carrier medium as recited in claim 8, wherein the link word and the data set reside within a single window for display upon the display device, and wherein the single window is accessible by a pointer device linked to the on-screen pointer via a graphical user interface.

10. The computer-usable carrier medium as recited in claim 8, wherein the link word and the data set reside within two separate windows for display upon the display device, and wherein the two separate windows are accessible by a pointer device linked to the on-screen pointer via a graphical user interface.

11. The computer-usable carrier medium as recited in claim 10, wherein the two separate windows are adapted for concurrent display upon the display device.

12. The computer-usable carrier medium as recited in claim 8, wherein the data set is linked to an applications program to form computer executable code.

13. The computer-usable carrier medium as recited in claim 8, wherein the data set comprises several grouping of fields that define a waveform output for a programmable device.

14. The computer-usable carrier medium as recited in claim 8, wherein the data set comprises several grouping of fields that define address, data, control and timing signals sent from a programmable interface to a peripheral device.

15. The computer-usable carrier medium as recited in claim 8, wherein the link word is activated by a user of the computer program to modify the data set.

16. An apparatus for generating programmable signals, comprising:
   a compiler for generating a data set containing at least one field of bits in response to user-activation of a link within a comments portion of a program; and
   hardware for generating programmable signals in response to the field of bits.

17. The apparatus as recited in claim 16, wherein the link is accessible by a user via a graphical user-interface.

18. The apparatus as recited in claim 16, wherein the data set is linked to an applications program to form computer executable code operable upon the hardware for generating the signals.

19. The apparatus as recited in claim 16, wherein the data set and the comments portion of the program are depicted upon a screen of a display device.

20. The apparatus as recited in claim 16, wherein the link comprises at least one word located one the same line as text that follow a comments designator.

21. The apparatus as recited in claim 20, wherein the comments designator notes the corresponding line of text as non-executable words separate and distinct from lines of program commands.

* * * * *

UNITED STATES PATENT AND TRADEMARK OFFICE
CERTIFICATE OF CORRECTION

| | |
|---|---|
| PATENT NO. | : 7,346,849 B1 |
| APPLICATION NO. | : 09/826998 |
| DATED | : March 18, 2008 |
| INVENTOR(S) | : Mulligan et al. |

It is certified that error appears in the above-identified patent and that said Letters Patent is hereby corrected as shown below:

Col. 11, line 5: In claim 20, before the phrase "the same line", please delete "one" and substitute --on--.

Signed and Sealed this

Fifth Day of May, 2009

JOHN DOLL
*Acting Director of the United States Patent and Trademark Office*